United States Patent [19]

Miller

[11] 4,211,300
[45] Jul. 8, 1980

[54] AIR GUN WITH RECIPROCATING SHUTTLE

[75] Inventor: Adrian D. Miller, Galveston, Tex.

[73] Assignee: Western Geophysical Co. of America, Houston, Tex.

[21] Appl. No.: 5,654

[22] Filed: Jan. 22, 1979

[51] Int. Cl.² ............................................. G01V 1/38
[52] U.S. Cl. .................................... 181/120; 367/144
[58] Field of Search ............... 181/120, 119, 113, 115; 367/144

[56] References Cited

U.S. PATENT DOCUMENTS

| | | | |
|---|---|---|---|
| 4,049,078 | 9/1977 | Paitson et al. | 181/120 |
| 4,180,139 | 12/1979 | Walker | 181/120 |

Primary Examiner—Howard A. Birmiel
Attorney, Agent, or Firm—William A. Knox

[57] ABSTRACT

An improved air gun consists of an elongated cylindrical housing for containing a volume of compressed air that is closed at each end by end plates. A radially-positioned exhaust port is bored into the wall of the housing. A hollow, cylindrical shuttle, is mounted concentrically inside the housing for linear back-and-forth sliding motion in alternate strokes. The ends of the shuttle are closed by end faces. A radially positioned sealing pad has an orifice that is alignable with the exhaust port is supported by the shuttle. When the shuttle is at either end of a stroke, the sealing pad blocks the exhaust port. The space between each shuttle end face and the respective housing end plates form shuttle-actuation control chambers. A small air leak in each control chamber maintains the residual air pressure therein at ambient when the guns is inactive. To fire the gun, a small quantity of air is diverted by valving from inside the housing to one of the control chambers. The inrush of compressed air to the control chamber greatly exceeds the leakage rate of the air leak and accelerates the shuttle towards the opposite end of the housing. During passage from one end of the housing to the other, the orifice in the sealing pad momentarily opens the exhaust port to emit a jet of compressed air. Upon completion of the stroke, the diversion valving is disabled and the residual air pressure in the control chamber returns to ambient.

7 Claims, 2 Drawing Figures

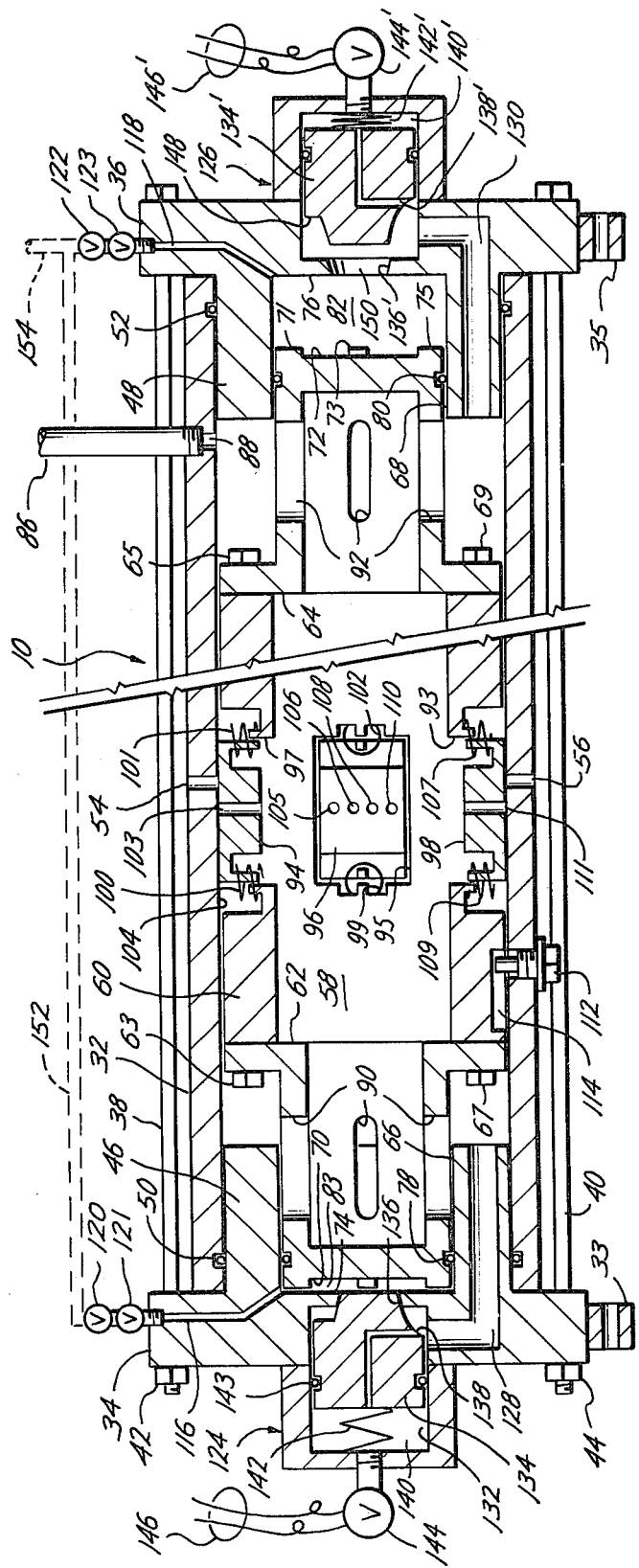

AIR GUN WITH RECIPROCATING SHUTTLE

BACKGROUND OF THE INVENTION

1. Field of the Invention

This invention relates to devices used for the sudden release of energy and in particular it relates to seismic sound sources such as air guns, used to release a pressurized gas such as air, into a body of water.

2. Technical Description of the Prior Art

Conventional air guns contain a gas under pressure, usually air compressed to 500 to 8000 lb/in$^2$ (3.448×10$^6$ to 55.16×10$^6$ Newtons/m$^2$). A value mechanism is mechanically, pneumatically, or hydraulically actuated to suddenly release the compressed air over a period of a few milliseconds to generate an acoustic impulse.

In general, a conventional air gun has at least two chambers; a control chamber and a firing chamber. Usually, the two chambers are in fluid communication with each other via restricted metering passageways so that the air pressure can be equalized between the two chambers. The firing chamber is provided with exhaust ports which, when the gun is armed, are sealed by a valve such as a sliding sleeve, piston, or plunger valve. The valves, of whatever type, have two faces of different areas. The valve face exposed to the air pressure in the control chamber has the greater area. Accordingly, the differential forces acting against the two valve faces, hold the valve closed to seal the exhaust ports. To fire the gun, the differential forces are upset by lowering the pressure in the control chamber, or by slightly raising the pressure in the firing chamber. The pressure in the firing chamber forces the valve to abruptly open so that the air in the firing chamber explosively escapes through the exhaust ports. To open the exhaust ports, the valve moves in one direction only. Moving in the opposite direction, the valve closes the exhaust ports.

As noted above, valve members used in air guns may be of the sleeve, plunger, or piston type. Sleeve or plunger valve-members are moved by an actuator or driving mechanism against a seat to block the escape of high pressure air through the exhaust ports. To fire the gun the actuator then moves the valve member abruptly away from the seat in a direction parallel to the plane of the exhaust port. In the piston type, the valve member moves perpendicular to the plane of the exhaust port. In all types, the actuating or drive mechanism drives the valve member in one directon of motion to unblock the exhaust ports. The actuator then reverses the direction of motion of the valve member to drive it back against the seat so that the firing chamber can be recharged. Valve actuation systems must control large forces and typically require several complex pilot-valve amplification stages to perform their task.

U.S. Pat. No. 3,638,752 to Wakefield shows an air gun using a cylindrical sliding sleeve valve that abuts against a seat to close the exhaust ports. U.S. Pat. No. 3,039,292 to Ottestad reveals a plunger-type valve member. Typical piston type valves are shown in U.S. Pat. Nos. 3,276,534 to Ewing, 3,310,128 to Chelminski, and 3,896,898 to Kirby.

The two major disadvantages of the conventional, above-described guns are related to the speed of operation and to the complexity of the valve actuator system or driving mechanism that is required to control the large forces involved.

The prior-art air guns were wasteful of air because of their low speed of operation. The requirement for valve-member motion-reversal, that is, motion in a first direction to open the valve and motion in the reverse direction to close the valve, created an unavoidable lengthy period of time during which the exhaust ports remained open. Of course, compressed air bled from the firing chamber throughout the entire period that the valve was open during a firing cycle. It is known that it is only the initial outrush of air, which takes place just as the valve member first opens the exhaust ports, that generates useful acoustic energy. Further release of air following the initial outrush of air, such as in the prior-art guns contributes nothing to the strength of the acoustic pulse and is wasteful.

Another type of sound source, generally used to produce either continuous-wave or chirp signals, employ a type of rotary valve that acts as a siren. For example see U.S. Pat. Nos. 4,033,429 and 3,738,446. Siren type sound sources are not suitable for use where a single acoustic pulse is desired.

In related co-pending application Ser. No. 905,491, filed May 12, 1978, now U.S. Pat. No. 4,180,139, assigned to the assignee of this invention, an economical efficient seismic sound source is disclosed. Having a minimum of moving parts, this air gun includes a housing for containing the compressed gas and an exhaust port through which the gas may be released. A valve member or sealing pad is mounted for linear, back-and-forth motion in the chamber and may be positioned against the exhaust port in several sealing positions to block the port. The valve member has an orifice therethrough. The valve member may be moved by an actuator or shuttle in one continuous motion, without reversing direction, from one sealing position, through a firing position wherein the orifice is aligned with the exhaust port to emit an air jet, thence to another sealing position.

To fire the gun again, the valve member may be returned to the first sealing position. For additional firings the valve member may be driven back and forth between the two positions in alternate strokes, resulting in one firing for each stroke.

In operation of this air gun, the actuator or shuttle was driven back and forth in the housing by applying control-air pressure against the shuttle alternately at opposite ends of the gun. Two control-air hoses as well as a firing-air hose were required, extending from a boat to the gun. The resulting hose bundle was difficult to handle in the field. Furthermore, due to the great length of the hoses that were several tens to several hundreds of feet long, there was a lag between the time that air pressure was initially applied to the control-air line at the boat control panel, and the time that the gun actually fired. This invention is an improvement in the gun fire-control means.

SUMMARY OF THE INVENTION

It is the purpose of this invention to provide an efficient means for actuating a reciprocating-shuttle type air gun without the use of surface-connected air hoses except for the main air supply hose.

The improved air gun consists of an elongated outer cylindrical housing for containing a volume of compressed air and at least one exhaust port. The housing is closed at each end by an end wall or an end plate. A shuttle-assembly air releasing means having a closed end face at each end, is mounted concentric with the housing and may be accelerated back and forth within the housing. The housing and shuttle are filled with compressed air at a first pressure. The spaces between the end faces of the shuttle and the housing endwalls form shuttle-actuation control chambers at each end of the gun. The volume in the housing and hollow shuttle assembly is sealed from fluid communication with each shuttle actuation control chamber except via a normally-closed diverter valve. The respective control chambers each have a permanent air leak, whose leakage rate can be controlled, to maintain the residual air pressure in the control chambers at a second pressure when the shuttle is at rest. Upon command, some of the compressed air from the housing is diverted into one of the control chambers by a diverter valve. The so-diverted compressed air, acting on one end face of the shuttle, accelerates the shuttle towards the opposite end of the housing, the volume of diverted air being sufficient to overcome the leakage rate of the air leak in the one control chamber.

In an embodiment of this invention, the diverter valve is an electro-pneumatic poppet valve.

In another embodiment of this invention, the second pressure is the external ambient pressure.

In yet another embodiment of this invention, the air leak is adjustable so that the residual air pressure in said control chambers remains at a desired pressure above ambient but substantially less than the pressure in said housing, in order to provide an air cushion to decelerate the shuttle.

In another embodiment of this invention, the residual air pressure in said control chambers is maintained at a pressure less than ambient.

BRIEF DESCRIPTION OF THE DRAWINGS

Other features and advantages of this invention will be better understood by reference to the drawings and the accompanying description wherein:

FIG. 1 is a schematic representation of the manner of use of an air gun in seismic exploration;

FIG. 2 is a detailed cross-sectional view of the gun illustrated schematically in FIG. 1.

DETAILED DESCRIPTION OF THE PREFERRED EMBODIMENT

The seismic sound source of this invention is an air gun 10 (FIG. 1) towed by a boat 12 through a body of water 14 for generating therein an acoustic pulse 16. When the acoustic pulse travels outwards from gun 10, it impinges upon a subsurface layer 18 and is reflected therefrom as a seismic wave or signal indicated by ray paths 20, 20', 20".

The reflected seismic waves travelling along paths 20, 20', 20", are detected by hydrophones 21, 21', 21", mounted in a long streamer cable 22. Streamer cable 22 is towed by boat 12 from cable reel 24. The detected seismic waves are converted to electrical signals which are in turn transmitted to a recording system 26 on boat 12 by any well-known means.

In a preferred embodiment, gun 10 (FIG. 2) consists of a cylindrical outer housing 32 secured between two end plates 34, 36 that are clamped together by tie bolts 38, 40 and nuts 42, 44, to form end walls. Although only two such tie bolts are shown, four or more are used in practice. Towing eyes, 33, 35 are attached to end plates 34, 36 for receiving towing cables. Housing 32 fits over shoulders or bosses 46, 48 which are a part of end plates 34, 36. An air tight seal is provided by O-rings 50, 52.

Housing 32 has exhaust ports 54, 56 disposed radially around a circumference of gun 10. Each exhaust port may take the form of a set of round holes or it may be a slot. A set of four or fives holes per port are preferred because the holes offer less abrasive action to the moving parts than do slots as will be described later. The size of the holes and the total number of ports provided depend on the desired power output. Sets of four 5/16" holes per exhaust port and up to 72 exhaust ports are not uncommon.

A shuttle assembly 58 is mounted concentrically with housing 32 and is free to slide back and forth linearly in the housing between end plates 34 and 36. Shuttle 58 includes an enlarged center portion 60 and two end portions 62, 64 having a reduced diameter. The three portions are bolted together by bolts such as 63, 65, 67, 69 to form the shuttle assembly. The reduced portions 62, 64 of the shuttle assembly slide within and are guided by the inner walls 66, 68 of shoulders 46 and 48. The reduced diameter portions 62 and 64 of the shuttle have closed end faces 70, 72. The volumes between end faces 70, 72 of shuttle assembly 58 and the housing end walls 74, 76, form shuttle actuation control chambers 82, 83 at the opposite ends of gun 10. O-rings 78, 80 seal the control chambers from fluid communication with the interior of shuttle 58. Compressed air from air compressor 84 on boat 12 is fed through a hose 86 into housing 32 through air inlet port 88. Several slotted openings such as 90, 92 in shuttle 58 allow free passage of air between the interiors of housing 32 and shuttle 58. The end faces 70, 72 of shuttle 58 are undercut so as to leave several upset portions 71, 73, 75 as shown at the right hand end of the shuttle. The purpose of the upset portions is to provide a small-volume shuttle-actuation control chamber when the shuttle is at one or the other extremes of travel.

Sealing pads, such as 94, 96, 98 are floatingly mounted in apertures 93, 95, 97, milled into the wall of shuttle 58, and are supported by springs such as 99, 100, 101, 102, 107, 109 that press each sealing pad against the inner wall 104 of housing 32. The purpose of the compression springs is to hold the sealing pads in place when the gun is inactive. When filled with compressed air, the internal air pressure holds the sealing pads in intimate contact with the inner wall 104 of housing 32. There as many sealing pads as there are exhaust ports; three pads are shown in FIG. 2. Each pad has several orifices such as 103, 105, 106, 108, 110, 111 shown in sealing pads 94, 96, 98. When the shuttle is at rest at one or the other extreme of travel, the exhaust ports in housing 32 are sealed by the sealing pads. When, however, shuttle 58 is accelerated from one end of the housing to the other, the orifices, which are precisely radially alignable with corresponding exhaust ports, pass by the exhaust ports and momentarily open them, permitting some of the compressed air inside the housing to escape explosively. The shuttle assembly 58 with its sealing pads is kept radially aligned with respect to the exhaust ports by means of stud 112 which fits into a slot 114 milled in the outside wall of the shuttle. To reduce the effects of abrasion, sealing pads 94–98 are made of Torolon 4301 plastic, which is made by Polymer Corporation of Reading, Pa. 19603.

End plates 34, 36 include permanent air leaks 116, 118 having a controllable leakage rate which may be adjusted by a fixed orifice 120, 122. Typically, the orifice has a diameter of about 0.030 inch. The purpose of the air leak is to reduce the residual air pressure in the control chambers 82, 83, to ambient pressure when the shuttle 58 is at rest between firings; accordingly, at rest, the control air pressures are in equilibrium. The leak also maintains the residual air pressure at ambient in one shuttle actuation control chamber when compressed air is supplied to the opposite control chamber at the other end of the gun during a firing cycle as will be explained below. Ambient pressure is defined as the hydrostatic pressure head to which the gun is subjected when immersed in the water at a desired operation depth.

The end plates include diverter valve assemblies 124, 126 and air diversion channels 128, 130. The diverter valves are electro-pneumatic, spring-loaded poppet valves.

Since valves 124 and 126 are identical, only valve 124 will be described in detail. Valve 124 consists of cylinder wall 132, a valve member 134 having a tapered end that fits into a tapered valve seat 136 in end plate 34. A pressure equalization line 138 allows passage of compressed air from housing 32 through diversion channel 128 into chamber 140. Chamber 140 is sealed by O-ring 143, that encircles valve member 134, from line 128 except through equalization line 138. An adjustable metering orifice (not shown) in equalization line 138 regulates the closing speed of the valve. The air pressure in chamber 140 plus the force of spring 142 against the top face of valve member 134, securely holds diverter valve 124 closed. Since the residual air pressure in the space between end wall 74 and end face 70 of shuttle 58 is at ambient, and, under static gun conditions, the air pressure is equalized on both sides of valve member 134, there is no substantial back pressure acting against the valve member. A solenoid valve 144 which may be a high pressure Skinner valve, is connected to chamber 140. Solenoid valve 144 is actuated by an electrical signal from the boat transmitted over wires 146.

Operation of the gun proceeds as follows: Assume that shuttle assembly 58 was initially positioned to the extreme right hand end of housing 32. Upon receipt of an electrical signal, over wires 146' solenoid valve 144' opens for a short time, releasing the air in chamber 140'. With only the force of spring 142' acting, the air pressure existing in air diversion channel 130, pressing against the bottom shoulder 148 of valve member 134', lifts the member to open passageway 150. Since the pressure equalization line 138' is restricted with respect to the size of diversion line 130, valve 126 will remain open for a short time until the air pressure differential across valve member 134' becomes equalized once again as soon as solenoid valve 144' closes. Consequently, a large flow of compressed air enters chamber 82, accelerating shuttle assembly 58 to the left as shown. Since the air in the opposite shuttle-actuation control chamber between shuttle assembly end face 70 and end plate face 74 is at ambient, there is practically no back pressure to impede the travel of shuttle assembly 58. Because the volume of inward air flow into chamber 82 is very large through passageway 150 relative to the outward air leakage rate through air leak 118, the air leak has no significant effect on the shuttle-driving pressure. Shortly after shuttle assembly 58 comes to rest at the left hand end of the housing, the air pressure becomes equalized across valve member 134' and closes passageway 130, cutting off any further diversion of compressed air. The sizes of the restrictions in equalization line 138' and in air leak 118 are adjusted so that valve 126 closes within one or two seconds and a control chamber such as 82 is emptied, through air leak 118, in about four seconds. Since the normal time between firing cycles is 6 to 10 seconds, there is ample time to perform the valving operations. At the next firing cycle, the above described sequence of events is reversed so that valve 124 opens and shuttle assembly 58 is driven to the right end of housing 32.

Each time that the orifices 103, 111 in the sealing pads 94, 98 pass by exhaust ports 54, 56 (and also for all other exhaust ports and sealing pads) travelling in one direction or the other, the exhaust ports are momentarily opened to emit jets of air, creating the desired acoustic wave. The operating air pressure ordinarily used is 4000–8000 psi. Since the end faces 70 and 72 are about four inches in diameter, a total force of over 60,000 pounds is developed when air enters a shuttle-actuation control chamber. The shuttle assembly is accelerated to about 13 feet per second by the time that the sealing-pad orifices pass by and open the exhaust ports. The exhaust ports are open for about 5 milliseconds, producing a short, sharp acoustic pulse of equal duration.

At the end of a stroke, shuttle assembly 58 must be decelerated to a full stop. Depending upon the leakage rate of air leaks 116, 118, there may be insufficient residual air in the control air chambers to cushion the impact of the shuttle assembly when driven against an end plate. In one embodiment of this invention, a pressure regulator such as 121, 123 may be combined with metering orifices 120, 122 to maintain the air pressure at some fixed level above ambient but well below the operating air pressure of the compressed air when the shuttle assembly is at rest. By this means, a more effective air cushion may be provided, particularly at very shallow water depths less than 10 feet.

In some circumstances, the gun may be operated at very great depths in the water such where the ambient hydrostatic pressure is a substantial fraction of the operating air pressure. For example, at 2000 feet below the surface, the ambient pressure may be on the order of 800–1000 psi. In such a case, it has been found prudent to extend the air leak lines, through a suitable small-diameter conduit, to a shallower water depth or to the surface where the hydrostatic pressure is less. By this means, the residual air pressure in the shuttle actuation control chambers is maintained at less than ambient pressure. Thus, if the gun is to be operated at relatively shallow water depths, the shuttle actuation control chambers may be vented directly into the water. At very great depths, a vent line may be connected to air leak lines 116, 118 and extended to some shallower depth or even to the surface as shown by the dotted piping 152, 154 in FIG. 2. As shown, both air leaks can share the same air vent line 154. Since the air vent line may be small relative to the operating air supply line, no substantial bulk is added to the hose bundle.

An important feature of the gun of this invention is that, at rest between firings, there is no external pressure differential across the ends of the shuttle. Similarly, the internal shuttle pressure is balanced. There is no tendency for the gun to auto-fire as happens with the prior-art air guns that depend upon a differential force to hold the valve member in place. Furthermore, since the shuttle assembly is always at one end or the other of a stroke, the sealing pads securely cover the exhaust ports, preventing leakage. The shuttle cannot creep within its housing because the pressure internal to the shuttle forces the sealing pads firmly against the inner wall of the housing, developing sufficient friction to lock the shuttle in place when at rest.

Other embodiments will be apparent to those skilled in the air gun art, without departing from the spirit and scope of the invention. For example, the diverter valves and air diversion lines could be implemented by external plumbing instead of being effectively self contained.

I claim as my invention:

1. In an improved air gun for use in underwater acoustic signalling, the air gun being of a type having an elongated housing for containing a volume of compressed air, and having at least one exhaust port, each end of the housing being closed by an end wall, a hollow shuttle type air-releasing means having opposite end faces and having an opening alignable with said exhaust port mounted concentrically within the housing to slide linearly from one end to the other of said housing, and means for introducing a volume of compressed air at a first pressure into said housing, the improvement comprising:

means for forming shuttle-actuation control chambers at each end of said housing between the respective shuttle end faces and a corresponding housing end wall, said shuttle-actuation control chambers being normally sealed from fluid communication with the interior of said housing;

a permanent air leak having a preselected air leakage rate in each said control chamber for maintaining the residual air pressure therein at a preselected second pressure substantially lower than said first pressure when said shuttle is at rest;

means for momentarily diverting some of the compressed air from inside said housing into one of said shuttle-actuation control chambers at one end of the housing in sufficient volume that the inrush of compressed air exceeds said air leakage rate from that chamber and drives said shuttle to the other end of said housing, releasing a jet of air when said opening passes said exhaust port.

2. The improved air gun as defined in claim 1 wherein said diverting means is an electro-pneumatic poppet valve.

3. The improved air gun as defined in claim 1 comprising:

means for adjusting the leakage rate of said air leak.

4. The improved air gun as defined in claim 3 further comprising:

means, associated with said leakage-rate adjusting means, for holding the residual air pressure in each said shuttle-actuation control chamber to a preselected level above said second pressure when said shuttle is at rest.

5. The improved air gun is defined in claim 3 wherein said second pressure is the external ambient pressure.

6. The improved air gun as defined in claim 5 further comprising:

means, associated with said leakage-rate adjusting means for holding the residual air pressure in each said shuttle actuation control chamber to a preselected level below ambient pressure when said shuttle is at rest.

7. The improved air gun as defined in claim 3 comprising:

means, associated with said leakage-rate adjusting means for holding the residual air pressure in each said shuttle actuation control chamber balanced at a preselected level when said shuttle is at rest.

* * * * *